United States Patent [19]

Haas

[11] Patent Number: 5,523,893
[45] Date of Patent: Jun. 4, 1996

[54] STRAIN FREE TEMPERATURE-COMPENSATED OPTICAL MOUNTS

[75] Inventor: Edwin G. Haas, Seaford, N.Y.

[73] Assignee: Northrop Grumman Corporation, Los Angeles, Calif.

[21] Appl. No.: 294,038

[22] Filed: Aug. 24, 1994

[51] Int. Cl.⁶ .................................... G02B 7/02
[52] U.S. Cl. ........................... 359/820; 359/818
[58] Field of Search .................... 359/818, 819, 359/820

[56] References Cited

U.S. PATENT DOCUMENTS

| | | | |
|---|---|---|---|
| 3,904,276 | 9/1975 | Whitaker et al. | 359/820 |
| 4,057,332 | 11/1977 | Brubaker et al. | 359/820 |
| 4,778,252 | 10/1988 | Filho | 359/819 |
| 4,850,674 | 7/1989 | Hasselskog | 359/819 |
| 4,929,054 | 5/1990 | Ahmad et al. | 359/820 |
| 5,117,311 | 5/1992 | Nomura | 359/819 |
| 5,177,641 | 1/1993 | Kobayashi et al. | 359/820 |

FOREIGN PATENT DOCUMENTS

| | | | |
|---|---|---|---|
| 221566 | 4/1985 | European Pat. Off. | 359/820 |

*Primary Examiner*—Loha Ben
*Attorney, Agent, or Firm*—Terry J. Anderson; Karl J. Hoch, Jr.

[57] ABSTRACT

An optical mounting system is configured so as to locate a 360° shoulder all around the optical element periphery in both the object and image sides of the optical element. The shoulder allows expansion or contraction of the optical element both in the thickness direction of the optical element and in the direction normal to the optical axis when installed in the mounting assembly. Three small metal clips are used to maintain centering of the optics, the thermal expansion and contraction of these clips being coordinated with the clip geometry so that the optical material remains centered without induced stress or free play at either room temperature or at the operating temperature.

16 Claims, 5 Drawing Sheets

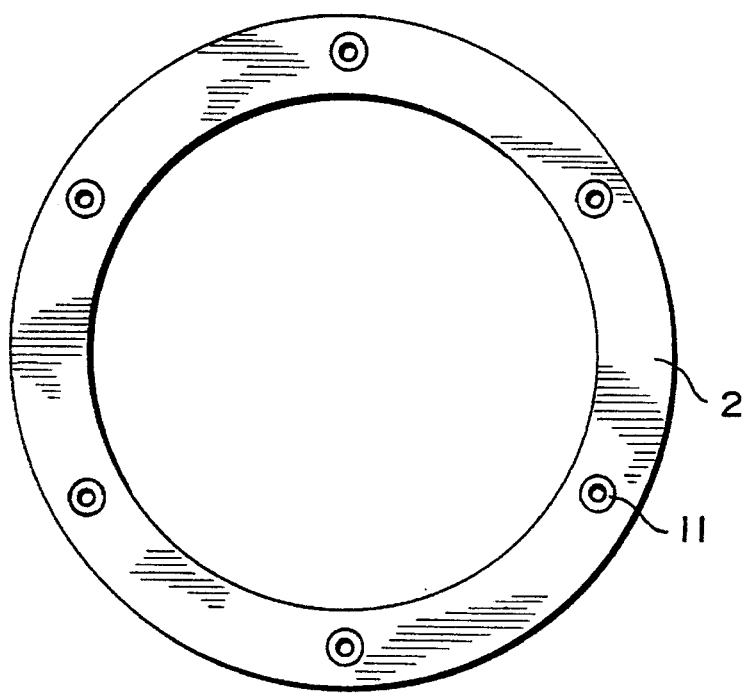
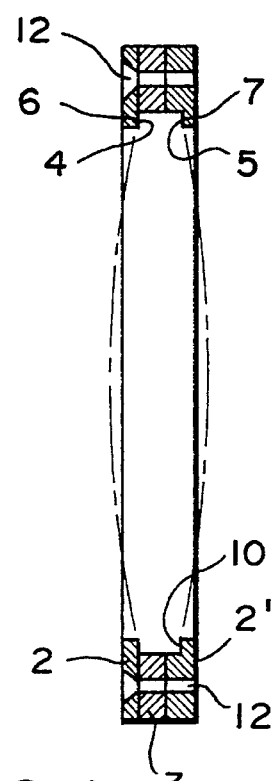
FIG. 2  FIG. 1
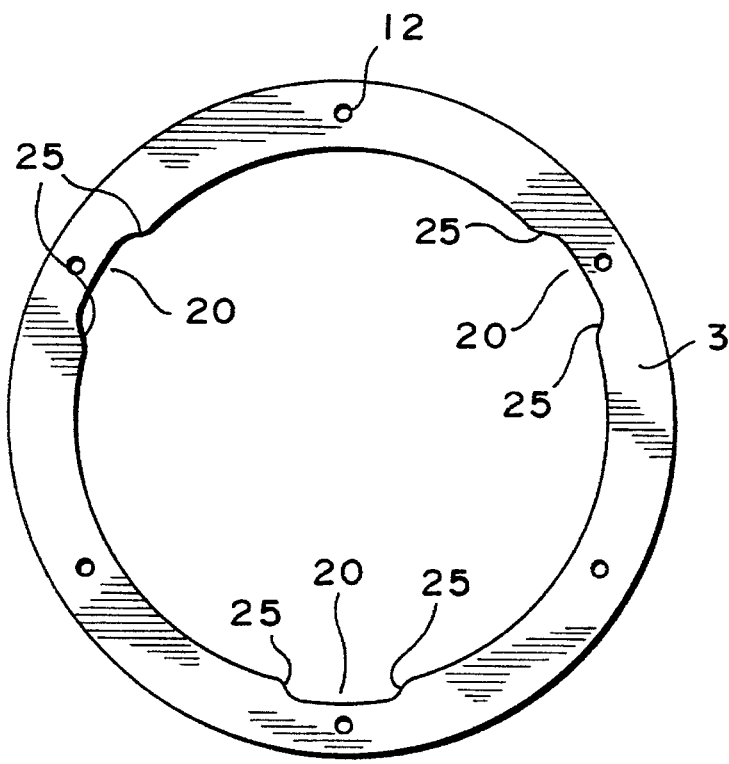
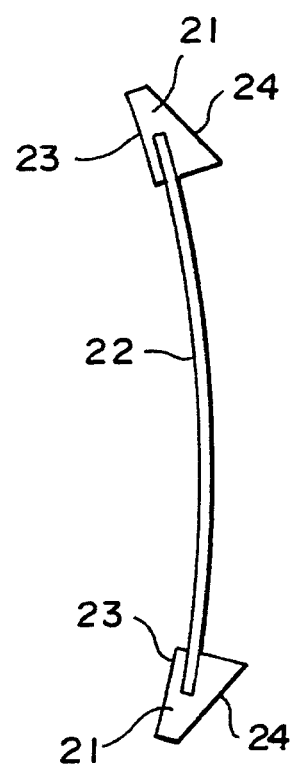
FIG. 3  FIG. 6

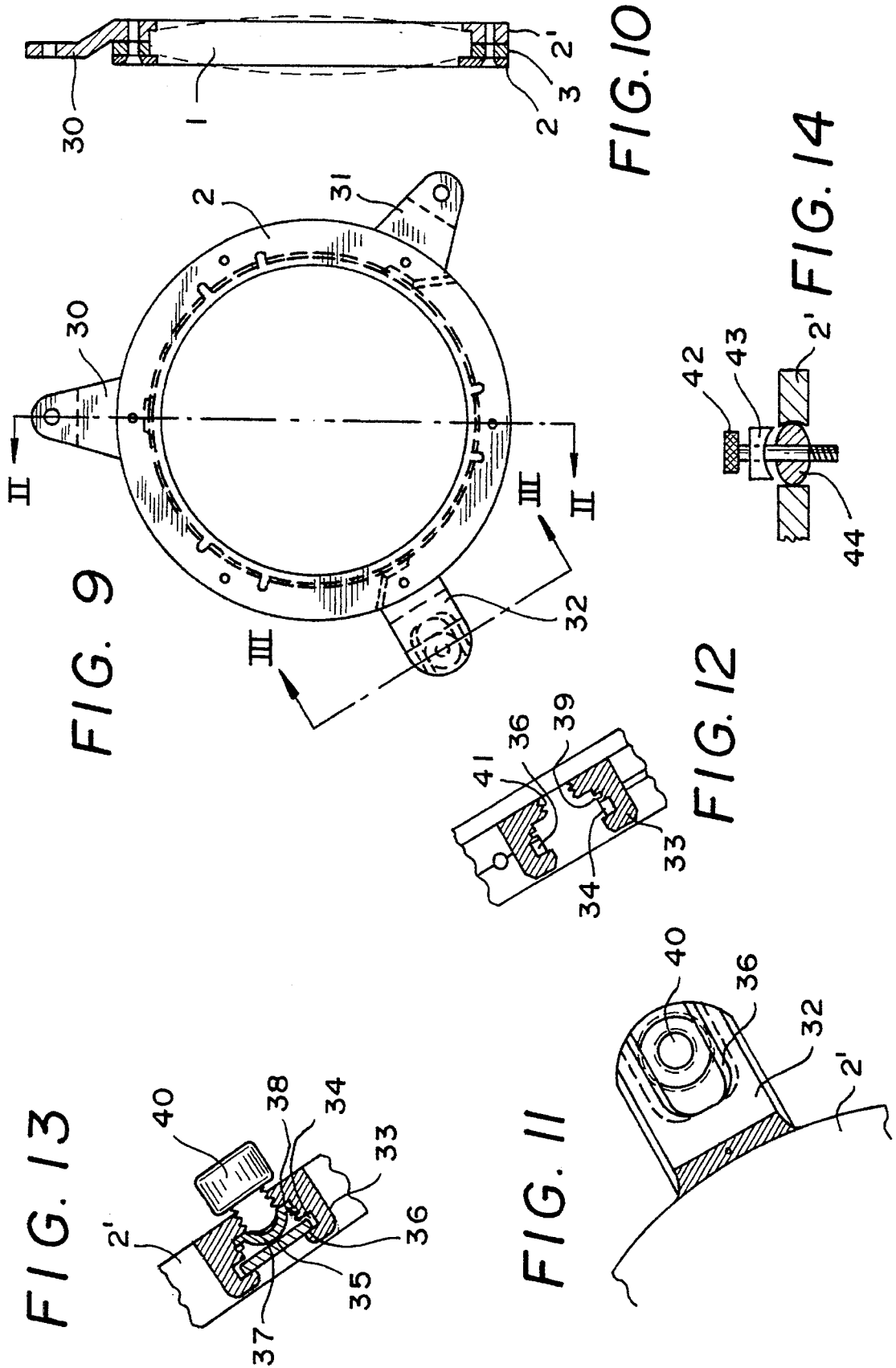

STRAIN FREE TEMPERATURE-COMPENSATED OPTICAL MOUNTS

BACKGROUND OF THE INVENTION

1. Field of the Invention

This invention relates to an optical mounting system, and in particular to an optical mounting system which allows optical elements of all kinds to be rigidly mounted and yet operated over a wide temperature range.

2. Description of Related Art

In precision optical systems such as interferometers, aberrations caused by strains in the optical materials can have a significant effect on the accuracy of the systems. Principal sources of strains in such systems include temperature-induced strains caused by differences in expansion coefficients between the material of the optical element and the material of the mounting, strains caused by rapid movement of the mounting for focusing and other purposes, or shocks resulting from movements of the device in which the element is housed.

The problem of temperature-induced strains is particularly significant in optical instruments where cryogenic operation is necessary for low signal-to-noise ratio operation, such as for spectral analysis in the infrared range, or which are to be used under extreme temperature conditions such as those found in outer space. While assembly and initial testing of a mounted optical element at cryogenic temperatures can substantially eliminate the problem of temperature-induced strain, such assembly is expensive and impractical, and thus it is conventional to provide a non-rigid mounting which allows for relative expansion and contraction of the optical element and mounting. The non-rigid mounting presents a further problem, however, because mountings which allow free play of the optical element have the disadvantage of allowing momentum to be transmitted to the optical element during rapid movements, causing movement-induced strains. In addition, such epoxy-based joints and spring clips are subject to breakage under conditions such as naval aircraft and spacecraft takeoffs and landings.

SUMMARY OF THE INVENTION

It is accordingly a first objective of the invention to provide an optical mounting system which positively mounts optical elements with no free play in a strain free state over a wide temperature range, thus eliminating both temperature- and movement-induced strains.

It is a second objective of the invention to provide an optical mounting system which can be optimally tuned for two different temperatures, such as the room temperature at which the optical mounting will be assembled and initially tested, and a cryogenic temperature.

It is a third objective of the invention to provide an optical mounting system which allows optical flats and lenses to reach cryogenic temperatures and operate strain-free so that spectral analysis can proceed into the infrared range without strain induced aberrations.

These objectives are achieved, in the preferred embodiments of the invention described below, by providing a completely rigid optical mounting which is nevertheless temperature-compensated in both the thickness direction of the optical element and in the radial direction.

Temperature compensation in the thickness direction of an optical element having a coefficient of thermal expansion $\alpha_1$ is achieved by providing a retainer in the form of two retaining members having a coefficient of thermal expansion $\alpha_2$ which engage opposite planar surfaces of the optical element and are separated by a third retaining member having a coefficient of thermal expansion $\alpha_3$ such that $\alpha_2 < \alpha_1 < \alpha_3$ or $\alpha_3 < \alpha_1 < \alpha_2$.

Temperature compensation in the radial direction of the optical element is achieved by leaving a space between the edge of the optical element and the third retaining member and by providing clips arranged to move radially in response to engagement between ramp surfaces on the clips and ramp surfaces on the third retaining member as the clip expands or contracts in a circumferential direction relative to both the optical element and the retaining member.

In addition, an embodiment of the invention is disclosed which also provides for expansion and contraction of the device, such as an actuator, to which the mounting is secured.

The preferred mounting system is ideally suited to interferometers and other similar precision optical instruments where aberrations can be caused by strains in the optical materials, although those skilled in the art will appreciate that the invention is by no means limited to interferometers, and that the low cost and simplicity of the preferred mountings described in detail below can allow optical elements of all kinds to be rigidly mounted and operated over a wide temperature range without changing optical geometry. The lens/flat mounting systems of the preferred embodiment are also well suited to withstand the rigors of naval aircraft as well as space craft landing and take-off conditions without concern for epoxy joints breaking free or retaining clips causing localized stresses or cracks.

BRIEF DESCRIPTION OF THE DRAWINGS

FIG. 1 is a cross-sectional view of a temperature compensated self-centering optical retainer constructed in accordance with the principles of a preferred embodiment of the invention.

FIG. 2 is a plan view of a first retaining member for the retainer of FIG. 1.

FIG. 3 is a plan view of a second retaining member for the retainer of FIG. 1.

FIG. 6 is a plan view of a centering clip for achieving temperature compensation in the radial direction of the optical element in the retainer of FIG. 1.

FIG. 9 is a plan view of an optical element retainer constructed in accordance with the principles of a second preferred embodiment of the invention.

FIG. 10 is a cross-sectional side view taken along line II—II of FIG. 9.

FIG. 11 is an enlarged plan view of a portion of the retainer illustrated in FIGS. 9 and 10.

FIG. 12 is a cross-sectional view of the retainer portion shown in FIG. 11, taken along line III—III of FIG. 9.

FIG. 13 is a cross-sectional view corresponding to that of FIG. 12, but with additional elements illustrated therein.

FIG. 14 is a cross-sectional view showing an alternative configuration for mounting flanges 30 and 31 of FIGS. 9 and 10.

DETAILED DESCRIPTION OF THE PREFERRED EMBODIMENTS

Figure 4:
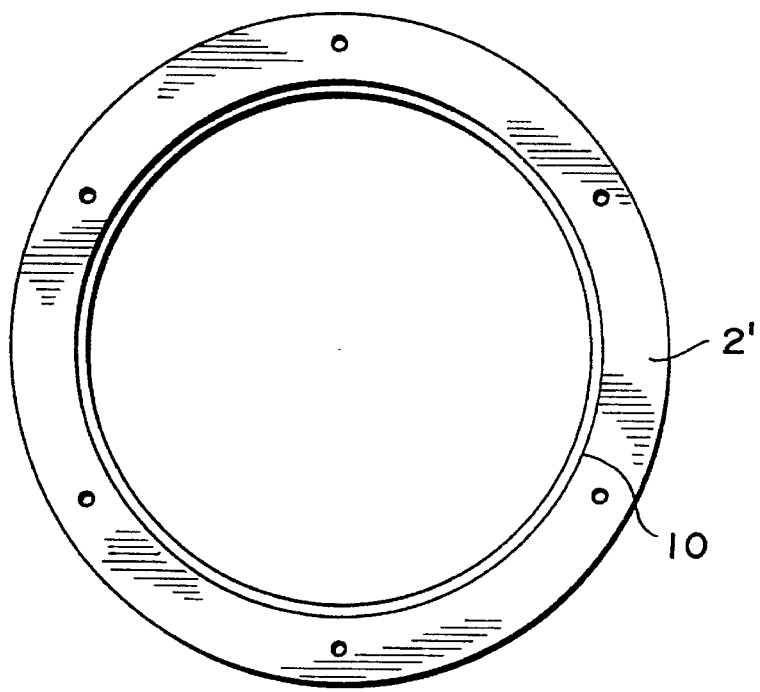
FIG. 4 is a plan view of a third retaining member for the retainer of FIG. 1.
Figure 5:
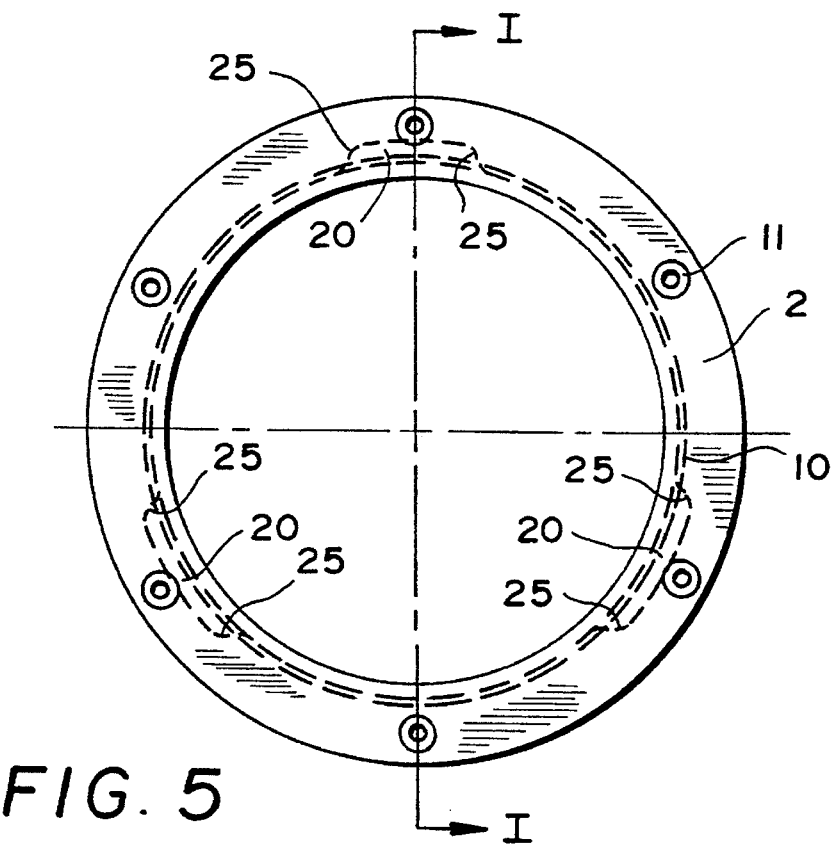
FIG. 5 is a plan view showing an assembled retainer made up of the retainer members shown in FIGS. 2–4, FIG. 1 having been taken along line I—I of FIG. 5.

FIGS. 1–5 show the structure of a temperature compensated self-centering optical retainer for an optical element 1 according to a first preferred embodiment of the invention.

The retainer includes three retaining members 2, 2', and 3, two of which (members 2 and 2') respectively include facing surfaces 4 and 5 which engage opposite planar surfaces 6 and 7 around the periphery on both the object and image sides of the optical element 1, with the third retaining member (member 3) separating the first two and sandwiched therebetween. In FIG. 1, the optical element 1 is illustrated as both a flat, shown in solid lines, and a lens, shown in dashed lines. The inner diameter of the outer retaining members 2 and 2' is less than the outer diameter of the optical element so that the outer members can securely engage the opposed planar surfaces, while the inner diameter of the inner retaining member 3, is greater than the outer diameter of the optical element in order to provide a clearance 9 (see FIG. 8) between the edge of optical element 1 and the inner edge of retaining member 3.

In the illustrated embodiment, one of the outer retaining member 2' has a step 10 to accommodate the thickness of the optical element, while the other outer retaining member 2 is illustrated as being planar. It will be appreciated by those skilled in the art, however, that both outer retaining members 2 and 2' can include a step although, as will become apparent from the following description, at least one of the retaining members must have a step so as to extend over the edge of the optical element. In addition, those skilled in the art will appreciate that while the optical element and retainer are depicted as being, respectively, circular and annular, other shapes could be accommodated. In the illustrated embodiment, the retaining members are secure together by fasteners 11 which extend through holes 12. The fasteners may be in the form of screws, some of which also extend completely through the assembly to permit rigid mounting to a supporting device or housing (not shown).

The material of the inner retaining member may be chosen so as to have a coefficient of thermal expansion which is lower than that of the optical element material, in which case at least the outer retaining member having the shoulder must have a coefficient of thermal expansion which is higher than that of the optical element material. Alternatively, the material of the inner retaining member may have a lower coefficient of thermal expansion than that of the optical element material, in which case at least one of the retaining members must have a higher coefficient of thermal expansion than the optical element material. Thus, for an optical element material having a coefficient of thermal expansion $\alpha_1$ and inner and outer retaining member materials having respective coefficients of thermal expansion $\alpha_2$ and $\alpha_3$, either $\alpha_2 < \alpha_1 < \alpha_3$ or $\alpha_3 < \alpha_1 < \alpha_2$ so that the coefficients of the retaining members bracket that of the optical element.

In all of the illustrated preferred embodiments of the invention, the operating temperature range and expansion/contraction properties of the optical flats/lenses must be known so that appropriate materials can be chosen. Preferably, the coefficients of thermal expansion $\alpha$ used herein are calculated or measured average values rather than published room temperature values. The use of calculated or measured values is preferred because published coefficients of thermal expansion are generally valid near room temperature only. Thermal properties of materials may be obtained from the National Institute of Standards and Technology (NIST). NIST publishes $\Delta L/L$ data for many materials. Using this data, an accurate overall $\alpha$ may be obtained by calculating $(\Delta L/L)/\Delta T = \alpha_{overall}$, where $\Delta T$ is the temperature difference between assembly/fabrication and operating temperatures.

By selecting two materials for mounts which have average coefficients of thermal expansion that bracket the optical material both above and below the optical materials average coefficient of thermal expansion, material thicknesses for the brackets may be calculated which give an overall expansion or contraction which is equal to that of the optical material. Fine tuning of the design is done using $\Delta L/L$ data. If transient behaviors for all of the materials chosen are similar, then induced transient thermal stresses will be negligible. Such optical instruments can operate when not in thermal equilibrium without optical flat/lens aberrations due to induced strains in the optical material.

To provide maximum optical mount rigidity, the optical flat or lens is configured so as to locate a 360° shoulder all around the lens periphery on both the object and image sides. This allows the lens or flat to be supported uniformly about its periphery. Highly accurate single point diamond turning (or other methods) can be used to machine the surfaces 6 and 7 on the optical element 1 to high levels of parallelism. These surfaces allow expansion or contraction of the optical flat or lens in the direction normal to the optical axis when installed in the mounting assembly.

Figure 7B:
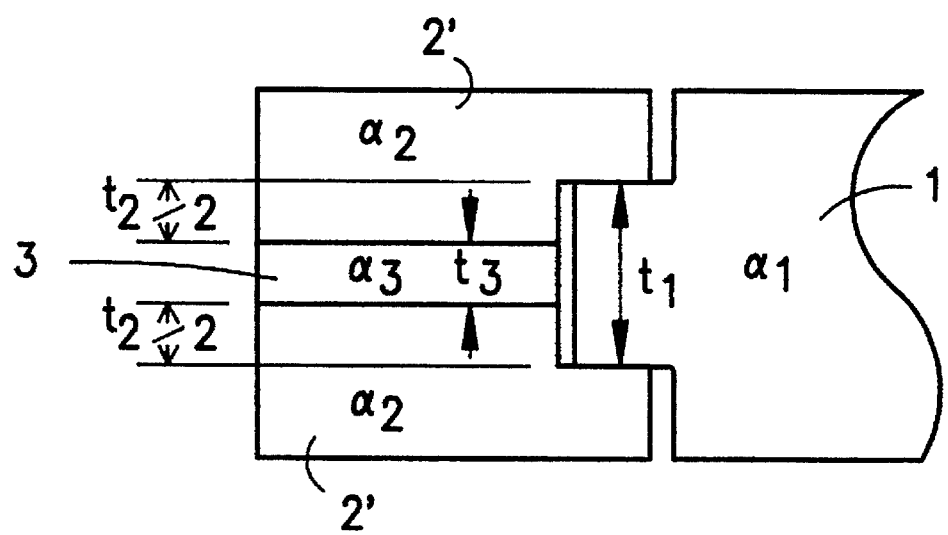
FIGS. 7a and 7b are cross-sectional side views corresponding to the cross-section of FIG. 1, but enlarged to illustrate the principles according to which temperature compensation in the thickness direction of the optical element is achieved.
Figure 7A:
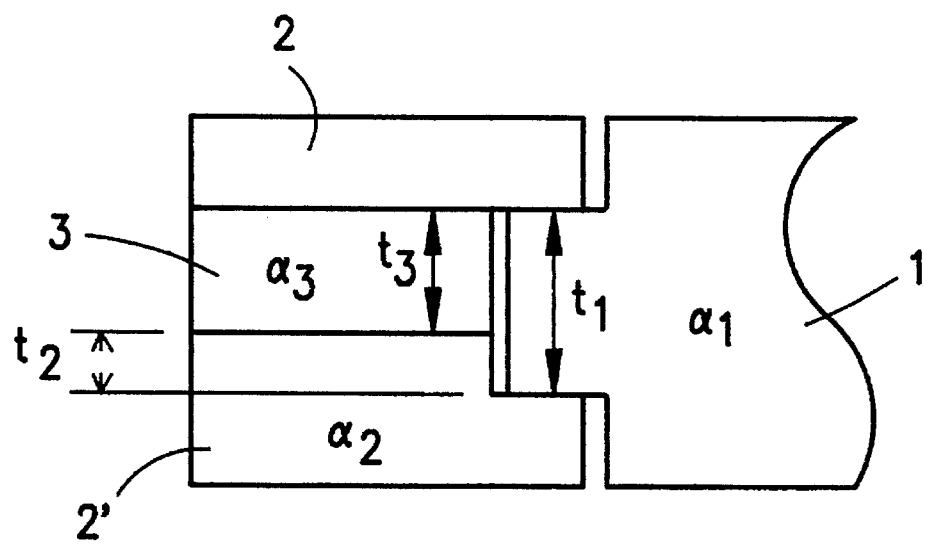

The thicknesses of the respective retaining members depend on the choice of materials, as is best understood in connection with FIGS. 7a and 7b. FIG. 5a illustrates the configuration of the preferred embodiment of FIGS. 1–4, while FIG. 5b shows an alternative but equivalent configuration in which both outer retaining members include steps and play an active role in the temperature compensation. The manner in which the coefficients of thermal expansion are chosen is the same in either case.

For a given temperature range $\Delta T$, the thickness of the cavity which retains the optical element 1 is given by the following formula: $t_{LHS} = t_2 + t_3$ (or $(½)t_2 + (½)t_2) + t_3$ for the arrangement shown in FIG. 7b). The symbol "$t_{RHS}$" is the thickness of the shoulder of the optical material, $t_1$. Using "$\Delta$" to represent the change in the given quantity between room temperature and operating temperature, it is desired to select the thickness and materials carefully for items 2, 2', and 3 such that the equation $\Delta t_{LHS} = \Delta t_{RHS}$ is satisfied. Since the coefficient of thermal expansion $\alpha$, by definition, is equal to $\Delta t/t\Delta t$, then $\Delta t_{LHS} = \alpha_2 t_2 \Delta T + \alpha_3 t_3 \Delta T = \alpha_1 t_1 \Delta T = \Delta t_{RHS}$ for any desired temperature range. In other words, the coefficients of thermal expansion and thicknesses of the retaining members are chosen so that the change in the width of the cavity formed by the inner surfaces of the outer retaining members which engage the opposite planar surfaces of the optical element will equal the change in thickness of the optical element for a given temperature change, so that the retaining members always positively engage the respective opposed surfaces of the optical element without causing any strain therein and with no free play.

As an example, for a germanium flat, $\alpha_3=3.07\times10^{-6}$ in/in/°F. Suitable materials for the rings include titanium which has a coefficient of $4.56\times10^{-6}$ in/in/°F. and tungsten which has a coefficient of $2.47\times10^{-6}$ in/in/°F. For a lens thickness of 6 mm, substitution into the above equations with appropriate units conversions results in $t_1=1.72$ mm and $t_2=4.28$ mm.

In order to provide radial temperature compensation, i.e., centering of the optics, three metal clips are placed in notches 20 between retaining member 3 and the edge of optical element 1. The thermal expansion and contraction of these clips is coordinated with the clip geometry so that the optical material remains centered without induced stress or free play at either room temperature or at the operating temperature of the optical system in which the optical element is to be used. The selection of the clip material is dependent upon material compatibility with the optical lens or flats and the contacting components over the full operating range of temperatures. The ramp block angle which is machined into both the centering clip and blocks and the retaining members is coordinated with the length of the clip or of a compensating strip in the clip. The blocks move apart as temperature increases and vice versa such that the mounted optical flat or lens remains unstressed and has no free play within the mounting assembly. These clips ensure that the optical materials stay centered with respect to the optical (or conjugate) axis.

As shown in FIG. 6, the centering clips each includes two ramp blocks 21 and a compensating strip 22. The ramp blocks include surfaces 23 shaped to engage an edge of the optical element and ramp surface 24 which engage a corresponding ramp 25 on the retaining member 3, the coefficient of thermal expansion of which is $\alpha_3$. The coefficient of thermal expansion of the compensating strip is $\alpha_4$, while the coefficient of thermal expansion of the ramp blocks is $\alpha_{BLOCK}$ (although those skilled in the art will appreciate that the ramp block coefficient of thermal expansion could easily be neglected since the block's change in length due to temperature change is small when compared to the thermal length changes of $R_R$ and $R_F$).

Figure 8:
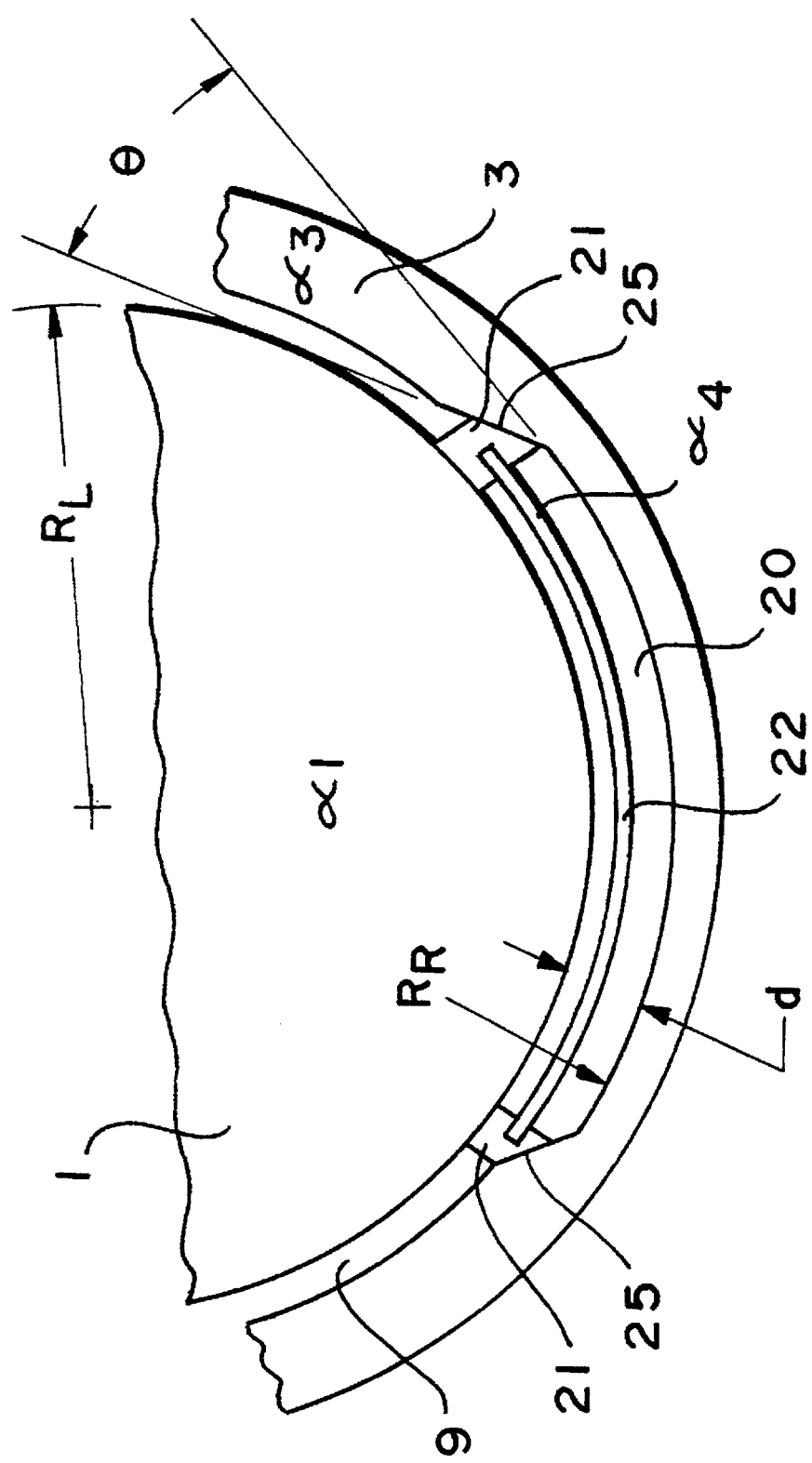
FIG. 8 is a plan view of the retaining member shown in FIG. 3 and clips corresponding generally to the clip shown in FIG. 7 in order to illustrate the principles according to which temperature compensation in the radial direction is achieved.

The parameters which must be calculated are L, which is the width of the clip, $\theta$, which is the angle of the ramp surface, and d, the thickness of the clip, all as shown in FIG. 8. $R_F$ and $R_R$ are, respectively, the radius of the optical element or "flat" and the radius of the retainer "ring," with the superscript RT indicating "at room temperature". The respective radii at the operating temperature depend on the coefficient of thermal expansion of the optical element and retaining member, as follows:

$$R_R = R_R^{RT} - \alpha_3 R^{RT} \Delta T = R^{RT}_R - \Delta R_R$$

$$R_F = R_F^{RT} \alpha_1 F^{RT} \Delta T = R^{RT}_F - \Delta R_F$$

$$d = d^{RT} - \alpha_{BLOCK} d^{RT} \Delta T = d^{RT} - \Delta d$$

$$L = L^{RT} - \alpha_4 L^{RT} \Delta T = L^{RT} - \Delta L$$

The gap or clearance 9 between the optical element 1 and the retaining member 3 at the operating temperature equals $R_R - R_F - d$, which equals $\Delta L \tan \theta$. $\theta$ is thus equal to $\tan^{-1}[R_R^{RT}(1-\alpha_3\Delta T) - R^{RT}_F(1-\alpha_1\Delta T) - d]/[L^{RT}(1-\alpha_{BLOCK}\Delta T)]$. If the material of the retaining member has $\alpha_3$ greater than the coefficient $\alpha_1$ of the optical element, then the length of the gap will decrease as the temperature drops from RT to the operating temperature, or increase as the temperature approaches the operating temperature in case the operating temperature is higher than room temperature. The length of the compensating strip must either decrease or increase in length sufficiently to compensate. If, on the other hand, the material of the retaining member 3 has a coefficient of thermal expansion $\alpha_3$ which is less than the coefficient of thermal expansion $\alpha_1$ of the optical element, then the gap length will increase as temperature decreases, and decrease as temperature increases from room temperature to the operating temperature. The material of the compensating strip must decrease in length less than the material of the retaining member 3 such that the net effect is for the compensating strip to increase in length relative to the retaining member 3. This will allow the ramp blocks to move further apart such that the gap between the ramp blocks, the retaining member 3, and the optical element 1 is maintained at zero over the operating range of temperature. Note that the compensating strip material is chosen and the ramp angle is calculated to yield a gap of zero. A positive gap would relate to radial free play whereas a negative gap refers to thermally induced strain.

By way of example, for $\alpha_1=3.07\times10^{-6}$ in/in/°F. (germanium), $\alpha_3=2.47\times10^{-6}$ in/in/°F. (tungsten), and $\alpha_4=13\times10^{-6}$ in/in/°F. (aluminum), and using radii $R_F^{RT}=1.358$ in., and $R_R^{RT}=1.504$ in., then for an operating temperature regulated by liquid nitrogen (77° K. or −320° F.), $\Delta T=68°$ F.$-(-320°$ F.$)=388°$ F. The new radii at cryogenic operating temperature 77K may be calculated from the above equations; $R_F=1.434$ in. and $R_R=1.503$ in. The length of the compensating strip, $L_{RT}=0.767$ in. may be chosen so that angle $\theta$, when calculated, is a reasonable value. Some iteration of this value may be necessary to set the resultant ramp angle to a convenient value. Angle $\theta$ is calculated by taking the arc tangent of the quotient of the gap divided by half the thermal change in length of the compensating strip, i.e., $\theta=\tan^{-1}[gap/\Delta L/2]=\tan^{-1}[(R_R-R_F-d)/\Delta L/2]=\tan^{-1}[1.503-1.434-0.0673)/(0.00388/2)]=33.8°$. Once $\theta$ is determined, $R_R^{RT}$ or $L^{RT}$ can be adjusted to give a more convenient angle.

In the embodiment of FIGS. 9–12, the construction of the retaining ring is identical to that shown in FIGS. 1–4, except that retaining member 2 (or 2') includes three mounting flanges 30–32 for mounting the optical element 1 in situations where housing expansion or contraction is a concern and/or when translators or actuators are needed for movement, axial adjustment, or positioning. Since the optical element is protected by the rigid mounting, thermal expansion of the device is accommodated by allowing relative movement between the retainer and the device through the use of a slot and tab arrangement.

In this arrangement, at least one of the mounting flanges is in the form of a claw 33 having a slot 34, which is fitted over a corresponding tab 35 (shown in FIGS. 12 and 13) on the housing of the device or actuator to which the optical element is to be mounted. The claw 33 is secured to the tab 35 by pressing the tab against claw surfaces 36 of the claw using a hemispherical contact 37. Contact 37 is retained in the claw 33 by a snap ring 38 seated in a groove 39 in the claw. When tab 35 is fitted into slot 34 and the optical mount is in position, a cap screw 40 extending through threaded opening 41 is tightened against contact 37 to clamp the tab 35 between the contact 37 and claw surfaces 36.

Finally, an alternative configuration for mounting flanges 30 and 31 of FIGS. 9 and 10 is shown in FIG. 14. In this configuration, retaining member 2' is mounted using a through bolt 42, a spherical washer 43, and a spherical bearing 44 retained rigidly in retaining member 2'.

Having thus described a preferred embodiment of the invention in sufficient detail to enable one skilled in the art to make and use the invention, it will be appreciated by the skilled artisan that variations of the invention are possible within the spirit of the invention and, consequently, it is intended that the invention not be limited by the above description or drawings, but rather that be limited only in accordance with the appended claims.

I claim:

1. Apparatus for rigidly mounting an optical element, comprising:

a retainer assembly which includes first and second outer retaining members for clamping opposed surfaces of an optical element between facing surfaces of the retaining members, and a third retaining member sandwiched between and separating the first and second retaining members, wherein at least one of the outer retaining members includes a step such that a portion of the at least one outer retaining member extends perpendicularly relative to said facing surfaces along an edge of the optical element, said first, second and third retaining members forming a cavity between said facing surfaces, wherein respective coefficients of thermal expansion of the at least one outer retaining member and the third retaining member bracket the coefficient of thermal expansion of the optical element such that a change in width of said cavity due to a change in temperature equals a change in thickness of the optical element, wherein a clearance is provided between the third retaining member and the optical element, and wherein the third retaining member includes ramp surfaces; and a centering clip, including at least two ramp blocks and a compensating strip, the ramp blocks including surfaces which engage the edge of the optical element and surfaces which engage the ramp surfaces of the third retaining member, said compensating strip being arranged to cause said ramp surfaces of said ramp blocks to move along said ramp surfaces of said third retaining member a distance sufficient to compensate for a change in size of said clearance caused by differing expansion of said optical element and said second retaining member due to a change in temperature.

2. Apparatus as claimed in claim 1, wherein said retaining members engage the optical element substantially completely around a periphery of the optical element on both the object and image sides.

3. Apparatus as claimed in claim 1, wherein the coefficient of thermal expansion of the optical element is $\alpha_1$, the coefficient of thermal expansion of the said at least one of the outer retaining members is $\alpha_2$, and the coefficient of thermal expansion of the third retaining member is $\alpha_3$, and wherein $\alpha_3 < \alpha_1 < \alpha_2$.

4. Apparatus as claimed in claim 1, wherein the coefficient of thermal expansion of the optical element is $\alpha_1$, the coefficient of thermal expansion of the said at least one of the outer retaining members is $\alpha_2$, and the coefficient of thermal expansion of the third retaining member is $\alpha_3$, and wherein $\alpha_2 < \alpha_1 < \alpha_3$.

5. Apparatus as claimed in claim 1, further comprising means for enabling the retainer assembly to be rigidly secured to a housing of an optical instrument.

6. Apparatus as claimed in claim 1, further comprising means for adjustably securing the retainer assembly to a housing by means of a flange in the form of a claw extending from the one of the outer retaining members, said claw including a slot for receiving a tab on the housing, and means for clamping the tab against surfaces of the claw.

7. Apparatus for rigidly mounting an optical element, comprising:

a retainer assembly which includes first and second outer retaining members for clamping opposed surfaces of an optical element between facing surfaces of the retaining members, and a third retaining member sandwiched between and separating the first and second retaining members, wherein at least one of the outer retaining members includes a step such that a portion of the at least one outer retaining member extends perpendicularly relative to said facing surfaces along an edge of the optical element, said first, second and third retaining members forming a cavity between said facing surfaces, and wherein respective coefficients of thermal expansion of the at least one outer retaining member and the third retaining member bracket the coefficient of thermal expansion of the optical element such that a change in width of said cavity due to a change in temperature equals a change in thickness of the optical element.

8. Apparatus as claimed in claim 7, wherein said retaining members engage the optical element substantially completely around a periphery of the optical element on both the object and image sides.

9. Apparatus as claimed in claim 7, wherein the coefficient of thermal expansion of the optical element is $\alpha_1$, the coefficient of thermal expansion of the said at least one of the outer retaining members is $\alpha_2$, and the coefficient of thermal expansion of the third retaining member is $\alpha_3$, and wherein $\alpha_3 < \alpha_1 < \alpha_2$.

10. Apparatus as claimed in claim 7, wherein the coefficient of thermal expansion of the optical element is $\alpha_1$, the coefficient of thermal expansion of the said at least one of the outer retaining members is $\alpha_2$, and the coefficient of thermal expansion of the third retaining member is $\alpha_3$, and wherein $\alpha_2 < \alpha_1 < \alpha_3$.

11. Apparatus as claimed in claim 7, further comprising means for enabling the retainer assembly to be rigidly secured to a housing of an optical instrument.

12. Apparatus as claimed in claim 7, further comprising means for adjustably securing the retainer assembly to a housing by means of a flange in the form of a claw extending from the one of the outer retaining members, said claw including a slot for receiving a tab on the housing, and means for clamping the tab against surfaces of the claw.

13. Apparatus for rigidly mounting an optical element, comprising:

a retainer assembly which includes first and second outer retaining members for clamping opposed surfaces of an optical element between facing surfaces of the retaining members, and a third retaining member sandwiched between and separating the first and second retaining members, wherein a clearance is provided between the third retaining member and the optical element, and wherein the third retaining member includes ramp surfaces; and a centering clip, including at least two ramp blocks and a compensating strip, the ramp blocks including surfaces which engage the edge of the optical element and surfaces which engage the ramp surfaces of the third retaining member, said compensating strip being arranged to cause said ramp surfaces of said ramp blocks to move along said ramp surfaces of said third clamping member a distance sufficient to compensate for a change in size of said clearance caused by differing expansion of said optical element and said second retaining member.

14. Apparatus as claimed in claim 13, wherein said retaining members engage the optical element substantially completely around a periphery of the optical element on both the object and image sides.

15. Apparatus as claimed in claim 13, further comprising means for enabling the retainer assembly to be rigidly secured to a housing of an optical instrument.

16. Apparatus as claimed in claim 13, further comprising means for adjustably securing the retainer assembly to a housing by means of a flange in the form of a claw extending from the one of the outer retaining members, said claw including a slot for receiving a tab on the housing, and means for clamping the tab against surfaces of the claw.

* * * * *